United States Patent
Dev

(10) Patent No.: US 12,011,622 B1
(45) Date of Patent: Jun. 18, 2024

(54) ACTIVE FORCE ELECTRIC FIELD ANTI-PATHOGENIC FABRIC AND METHODS OF CHARGING AND DEACTIVATING PATHOGEN PARTICLES

(71) Applicant: Florida A&M University, Tallahassee, FL (US)

(72) Inventor: Satyanarayan Dev, Tallahassee, FL (US)

(73) Assignee: Florida A&M University, Tallahassee, FL (US)

( * ) Notice: Subject to any disclaimer, the term of this patent is extended or adjusted under 35 U.S.C. 154(b) by 664 days.

(21) Appl. No.: 17/301,954

(22) Filed: Apr. 20, 2021

Related U.S. Application Data

(60) Provisional application No. 63/012,620, filed on Apr. 20, 2020.

(51) Int. Cl.
*A41D 13/00* (2006.01)
*A41D 13/11* (2006.01)
(Continued)

(52) U.S. Cl.
CPC ........ *A62B 23/025* (2013.01); *A41D 13/1192* (2013.01); *A41D 31/305* (2019.02); *A62B 7/10* (2013.01); *B01D 39/18* (2013.01); *B01D 39/2031* (2013.01); *D03D 1/0035* (2013.01); *D03D 15/217* (2021.01); *D03D 25/00* (2013.01); *D06M 16/00* (2013.01); *A41D 2500/20* (2013.01); *B01D 2239/0241* (2013.01); *B01D 2239/0407* (2013.01); *B01D 2239/0435* (2013.01); *B01D 2239/0442* (2013.01);
(Continued)

(58) Field of Classification Search
CPC ...... A41D 13/11–1138; A41D 13/1115; A41D 13/1192; D03D 1/0035–0088; A61M 16/105–107; A61M 2205/0205; A61M 2205/0238; A61M 2205/75–759; A62B 7/10; A62B 11/00; A62B 13/00; A62B 15/00; A62B 17/00; A62B 29/00; A62B 31/00
USPC .......................................... 128/863
See application file for complete search history.

(56) References Cited

U.S. PATENT DOCUMENTS

2017/0367416 A1* 12/2017 Yamada .................... A61L 9/16
2018/0311515 A1* 11/2018 Wilson ................ A61B 5/6803
2021/0244111 A1* 8/2021 Lai ..................... A41D 13/1192

OTHER PUBLICATIONS

Nguyen, L. C. et al. (2021). Cannabidiol Inhibits SARS-COV-2 Replication and Promotes the Host Innate Immune Response. bioRxiv : the preprint server for biology, 2021.03.10.432967.

* cited by examiner

*Primary Examiner* — Adam Baker
(74) *Attorney, Agent, or Firm* — Paul Murty; Smith & Hopen, P.A.

(57) ABSTRACT

An active force electric field anti-pathogenic fabric is used to remove pathogens from an environment surrounding the fabric. The fabric can be woven into daily clothing items, personal protective equipment, or other clothing items typically worn by a user. The fabric includes a current-carrying mesh that is coated with active materials used to remove pathogens from the air. As such, the fabric operates as an anti-pathogenic material that is used to remove harmful particles from an area surrounding a user. Accordingly, microorganisms, smoke particles, industrial pollutants, odor molecules, allergens are structurally disassociated into harmless protein fragments and natural molecules when encountering the purifying agents in the fabric.

20 Claims, 4 Drawing Sheets

(51) Int. Cl.
  *A41D 31/30* (2019.01)
  *A62B 7/10* (2006.01)
  *A62B 23/02* (2006.01)
  *B01D 39/18* (2006.01)
  *B01D 39/20* (2006.01)
  *D03D 1/00* (2006.01)
  *D03D 15/217* (2021.01)
  *D03D 25/00* (2006.01)
  *D06M 16/00* (2006.01)
  *D06M 101/06* (2006.01)
(52) U.S. Cl.
  CPC ............... *B01D 2239/0492* (2013.01); *B01D 2239/0613* (2013.01); *B01D 2239/065* (2013.01); *D06M 2101/06* (2013.01)

ACTIVE FORCE ELECTRIC FIELD ANTI-PATHOGENIC FABRIC AND METHODS OF CHARGING AND DEACTIVATING PATHOGEN PARTICLES

CROSS-REFERENCE TO RELATED APPLICATIONS

This nonprovisional patent application is a continuation of and claims priority to provisional patent Application No. 63/012,620, entitled "Active force electric field anti-pathogenic fabric," filed on Apr. 20, 2020, by the same inventor.

BACKGROUND OF THE INVENTION

1. Field of the Invention

This invention relates, generally, to pathogen eradication fabrics. More specifically, it relates to active force electric field anti-pathogenic fabrics that impart a charge on surrounding particles, including pathogens, to remove the pathogens from the surrounding area.

2. Brief Description of the Prior Art

Fabrics used to filter and prevent pathogens and other particles from reaching a respiratory tract of a user are increasing in importance, provided the prevalence of airborne viruses and bacteria, such as severe acute respiratory syndrome coronavirus 2 (SARS-CoV-2). For example, surgical masks provide a fabric barrier between a user and an exterior environment, such that at least a portion of contaminants surrounding the user do not penetrate through the masks. However, most protective fabrics that provide such a barrier are incapable of reuse and are limited to a singular use by the wearer, requiring replenished supplies of unused fabrics and contributing to excessive waste materials as used fabrics are designed to be disposable. To date, cloth fabrics have proven to be washable and reusable, but require an additional disposable filter material to be effective against particle transmission. Accordingly, regardless of the type of fabric, the current state of the art contributes to the inefficiencies associated with wasted materials.

In addition, respirators exist that filter particles or purify air surrounding the respirators, some of which may be reusable to provide non-temporary protection against particle transmission. However, such respirators are typically complex to manufacture and expensive due to the intricate component parts used therein. For example, devices exist that impart a charge on particles, including linen fibers. However, such devices typically require the use of ultraviolet lights or irradiation devices to impart the charge on the mesh, increasing the complexity of the devices and the associated costs.

Accordingly, what is needed is a reusable fabric that can be used to not only serve as a barrier to contaminants, but can also function to remove contaminants from the environment surrounding a user. However, in view of the art considered as a whole at the time the present invention was made, it was not obvious to those of ordinary skill in the field of this invention how the shortcomings of the prior art could be overcome.

While certain aspects of conventional technologies have been discussed to facilitate disclosure of the invention, Applicant in no way disclaims these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for an effective and simple fiber structure including an electric field used as an anti-pathogenic material is now met by a new, useful, and nonobvious invention.

The novel anti-pathogenic fabric includes a wearer-facing side opposite a surrounding environment-facing side, with the wearer-facing side configured to reside adjacent to a skin surface of a wearer. A first fiber layer is disposed proximate to the wearer-facing side, with the first fiber layer including a plurality of interwoven fiber strands forming a first mesh. In an embodiment, the first fiber layer includes an amount of hemp fiber strands which may be interwoven with an amount of natural non-hemp fiber strands and an amount of synthetic fiber strands. A second fiber layer is disposed proximate to the surrounding environment-facing side, such that the second fiber layer is spaced apart from the first fiber layer. Similarly, in an embodiment, the second fiber layer includes an amount of hemp fiber strands which may be interwoven with an amount of natural non-hemp fiber strands and an amount of synthetic fiber strands.

A photocatalytic layer coats the second fiber layer, such that the second fiber layer is disposed between the photocatalytic layer and the first fiber layer. The photocatalytic layer is configured to form a first contact surface for pathogenic particles translating in a direction toward the surrounding environment-facing side of the wearable device. One or more copper naphthenate particles are distributed on an outward-facing surface of the photocatalytic layer. The copper naphthenate particles and the photocatalytic layer are configured to impart an electrical charge onto the pathogenic particles translating in the direction toward the surrounding environment-facing side of the wearable device. The second fiber layer and the first fiber layer are configured to capture the electrically charged pathogenic particles to prevent the electrically charged pathogenic particles from traversing beyond the first fiber layer, thereby preventing interaction between the electrically charged pathogenic particles and the wearer. The fabric may be incorporated into a wearable device, such as a face mask that is configured to cover a respiratory tract of the wearer, such that the face mask prevents the electrically charged pathogenic particles from reaching the respiratory tract of the wearer.

In an embodiment, one or more of the first fiber layer and the second fiber layer is coated with a tetrafluoroethylene layer. For example, a tetrafluoroethylene layer may be disposed between the first fiber layer and the second fiber layer, and a tetrafluoroethylene layer may be disposed between the second fiber layer and the photocatalytic layer. In an embodiment, a plurality of microcapsules are incorporated into at least one of the first fiber layer and the second fiber layer. Each of the plurality of microcapsules includes an amount of a microbial substance therein, such that the plurality of microcapsules are configured to release the amount of the microbial substance via a controlled release.

The novel method of capturing pathogenic particles includes a step of interweaving a first plurality of hemp fiber strands into a first fiber layer. In addition, the method includes a step of interweaving a second plurality of hemp fiber strands into a second fiber layer. The second fiber layer is coated with a photocatalytic layer, such that the photocatalytic layer forms an outer contact surface. One or more copper naphthenate particles are distributed about the photocatalytic layer. As such, the first fiber layer, the second fiber layer, the photocatalytic layer, and the copper naphthenate particles form a wearable device configured to reside adjacent to a skin surface of a wearer. The copper naphthenate particles and the photocatalytic layer charge one or more pathogenic particles surrounding the outer contact surface. At least one of the second fiber layer and the first fiber layer capture the charged one or more pathogenic particles, such that each of the charged one or more pathogenic particles are prevented from reaching the skin surface of the wearer.

In an embodiment, the method includes a step of energizing the photocatalytic layer to interact with ambient air surrounding the outer contact surface, thereby forming a plurality of hydroxyl radicals on the outer contact surface. The step of charging one or more pathogenic particles thereby includes the step of reacting the one or more pathogenic particles with the plurality of hydroxyl radicals.

In an embodiment, the wearable device is a face mask cover a respiratory tract of the wearer. The face mask can be subjected to a cleaning agent and an amount of water, wherein the face mask is reusable after the step of subjecting the face mask to the cleaning agent and the amount of water.

An object of the invention is to provide an effective and simple fiber structure used not only to prevent contaminants from reaching a user, but also to eradicate the contaminants via a charged field surrounding the fiber.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

The present invention includes the use of an active force electric field anti-pathogenic fabric to remove pathogens from an environment surrounding the fabric. The fabric can be woven into daily clothing items, personal protective equipment, or other clothing items typically worn by a user. The fabric includes a current-carrying mesh that is coated with active materials used to remove pathogens from the air. As such, the fabric operates as an anti-pathogenic material that is used to remove harmful particles from an area surrounding a user. As such, the purifying agents in the fabric act on microorganisms, smoke particles, industrial pollutants, odor molecules, and allergens to structurally disassociate the particulates into harmless protein fragments and natural molecules.

Figure 1:
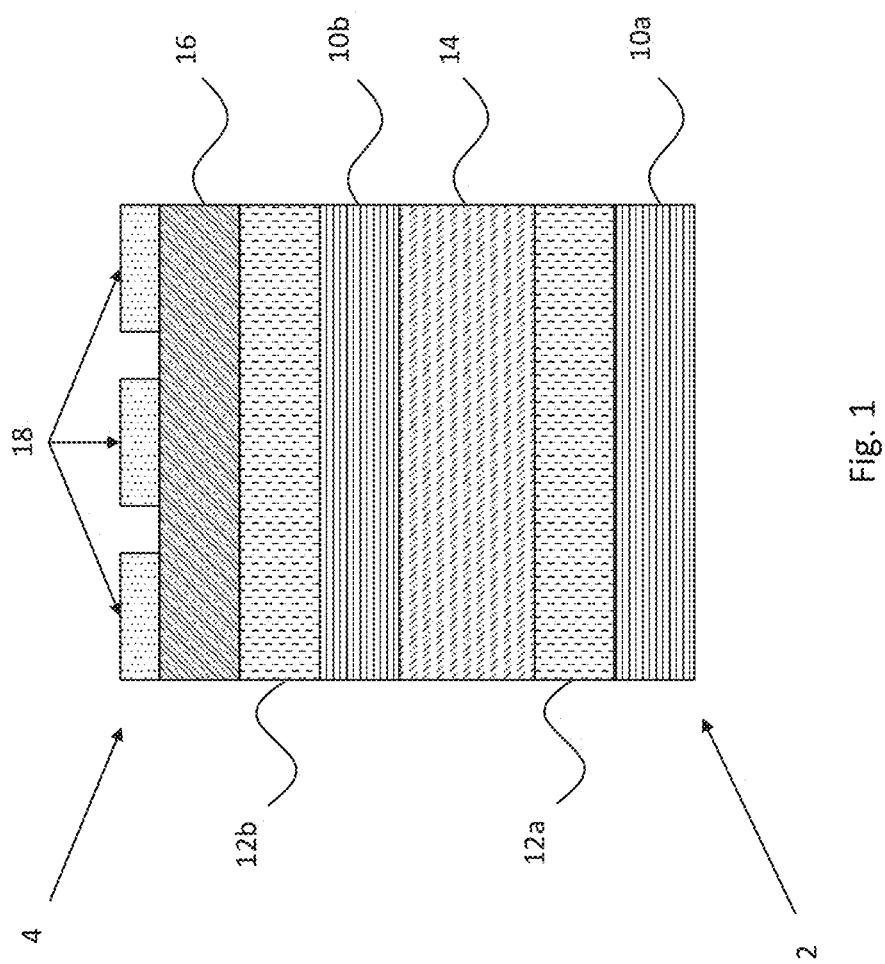
FIG. 1 depicts a fabric that is coated with a plurality of layers designed to charge and deactivate pathogen particles interacting with the fabric, such that the pathogen particles do not reach a respiratory tract of the wearer, in accordance with an embodiment of the present invention.

As shown in FIG. 1, in an embodiment, the fabric includes a plurality of layers arranged such that wearer-facing side 2 of the fabric is comprised of a fiber mesh, and such that surrounding environment-facing side 4 of the fabric is comprised of a coating designed to capture and deactivate airborne particles prior to interacting with the wearer's respiratory tract. Wearer-facing side 2 is opposite surrounding environment-facing side 4, with the plurality of layers disposed between wearer-facing side 2 and surrounding environment-facing side 4.

First fiber layer 10a is disposed proximate to wearer-facing side 2, forming a fabric mesh material that is designed to rest upon or be disposed adjacent to a wearer's skin. In an embodiment, first fiber layer 10a is formed of hemp fibers forming a mesh. Hemp is known to control microorganism propagation, and textiles can be formed from hemp fibers since hemp fibers are cellulosic fibers. Hemp fibers have excellent fiber length and strength, absorbency and durability, and anti-microbial (anti-fungal and anti-bacterial) properties. In addition, hemp fibers contain cannabinoids, which are potent antimicrobials that have been used to fight superbugs, including antibiotic-resistant bacteria and common fungal infections, such as candidiasis. In addition, cannabinoids help treat certain types of viral infections. [1]. Certain cannabinoids have been found to inhibit the replication of the COVID-19 causing SARS-CoV-2 virus. However, hemp is a poor conductor of electricity; as such, hemp fibers must be treated to be used within the current-carrying mesh of the fabric, as will be discussed in greater detail below.

First fiber layer 10a is coated with first tetrafluoroethylene layer 12a, which generates a layer of disinfectant ions to intercept particles prior to reaching first fiber layer 10a during the processes described in greater detail below. As such, first fiber layer 10a and first tetrafluoroethylene layer 12a form an attraction screen designed to capture particles prior to interaction with a user. The attraction screen formed by first fiber layer 10a and first tetrafluoroethylene layer 12a has a charge opposite of the particles, such that the particles are attracted to the attraction screen, thereby preventing the particles from interaction with the user.

In addition, second fiber layer 10b and second tetrafluoroethylene layer 12b are disposed proximate to surrounding environment-facing side 4, and spaced apart from first fiber layer 10a and first tetrafluoroethylene layer 12a. The distance between second fiber layer 10b and first tetrafluoroethylene layer 12a provides a space for the existence of electric field 14 therebetween, which will be discussed in greater detail below; however, in an embodiment, second fiber layer 10b is disposed proximate to first tetrafluoroethylene layer 12a. Second tetrafluoroethylene layer 12b is disposed proximate to surrounding environment-facing side 4 of the fabric. Similar to the attraction screen formed by first fiber layer 10a and first tetrafluoroethylene layer 12a, in an embodiment, second fiber layer 10b and second tetrafluoroethylene layer 12b include a charge opposite that of the particles, thereby capturing particles prior to entering the fabric.

As shown in FIG. 1, second tetrafluoroethylene layer 12b is coated on surrounding environment-facing side 4 with photocatalytic material 16, such as titanium dioxide (including sulfur-doped nano-titanium dioxide). In addition, one or more particles of copper naphthenate 18 (CuN) are distributed on photocatalytic material 18, forming a coating on surrounding environment-facing side 4 of the fabric. Copper naphthenate 18 is the copper salt of naphthenic acid, and is used to treat the hemp fibers. Applying the CuN coating on hemp fibers improved the electrical conductivity of the fibers while enhancing the biocidal effects making it suitable for a wide range of applications. CuN is not only permanently effective, but it is also compatible with human skin and the environment, such that the coating is safe and effective for use by humans without risking harmful side effects. These fabrics and protective clothing are useful in hospitals, nursing homes, schools, hotels, and crowded public areas to prevent infection from pathogens. Moreover, the fabric can be used as a hemp-incorporated nanofibrous polyurethane membrane or asymmetric chitosan membrane prepared by electrospinning as wound dressings. In addition, the fabrics can be durable through multiple cleaning cycles or outdoor exposure and has no adverse effects on other fabric properties including wear comfort and aesthetic of the fabric.

Figure 2:
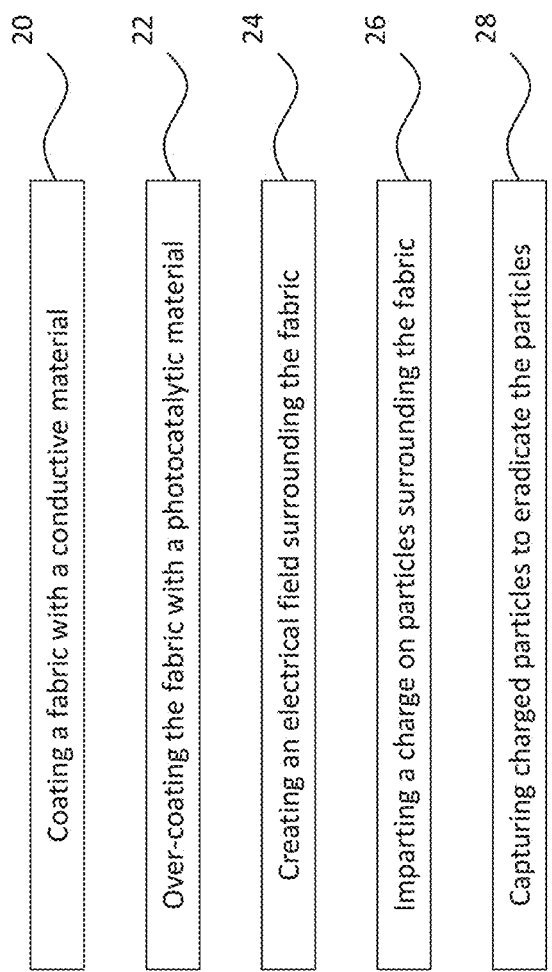
FIG. 2 is a process-flow diagram describing a method of removing pathogens from an ambient environment surrounding a charged fabric material, in accordance with an embodiment of the present invention.

Referring now to FIG. 2, in conjunction with FIG. 1, an exemplary process-flow diagram is provided, depicting a method of removing pathogens from an ambient environment surrounding a charged fabric material. The steps delineated in the exemplary process-flow diagram of FIG. 2 are merely exemplary of an order of removing pathogens by charging particles using an electric field created on a wearable fabric. The steps may be carried out in another order, with or without additional steps included therein.

As noted above, the fabric includes a current-carrying mesh. As described in FIG. 2, in an embodiment, the mesh is coated with tetrafluoroethylene (step 20) and further over-coated with an active photocatalytic material (step 22). The photocatalytic material is energized to create powerful dismantling agents on surface, including hydroxyl radicles, from natural ambient air (step 24). As such, the material utilizes the ambient air to create dismantling agents that can be used to remove pathogens from the surrounding environment.

Due to the current in the mesh, the fabric imparts or enhances positive or negative electrostatic charges on surrounding particles to increase decontamination (step 26). The charged particles migrate to an activated dismantling mesh within the fabric that includes an internal oppositely-charged attraction screen (step 28). Multiple dismantling meshes can be used within the fabric to capture positively charged particles and negatively charged particles, as well as neutral particles. Suspended water molecules are also drawn to the mesh in the same way, thereby providing a supply of raw material of water molecules that can be used to create the decontaminating agents. The resulting material is formed into a current-carrying mesh in accordance with the process flow diagram described in detail above. A resin precondensate can be included on the fiber to improve laundering durability, as well as an antimicrobial material used to further improve the efficacy of the fabric.

Figure 3:
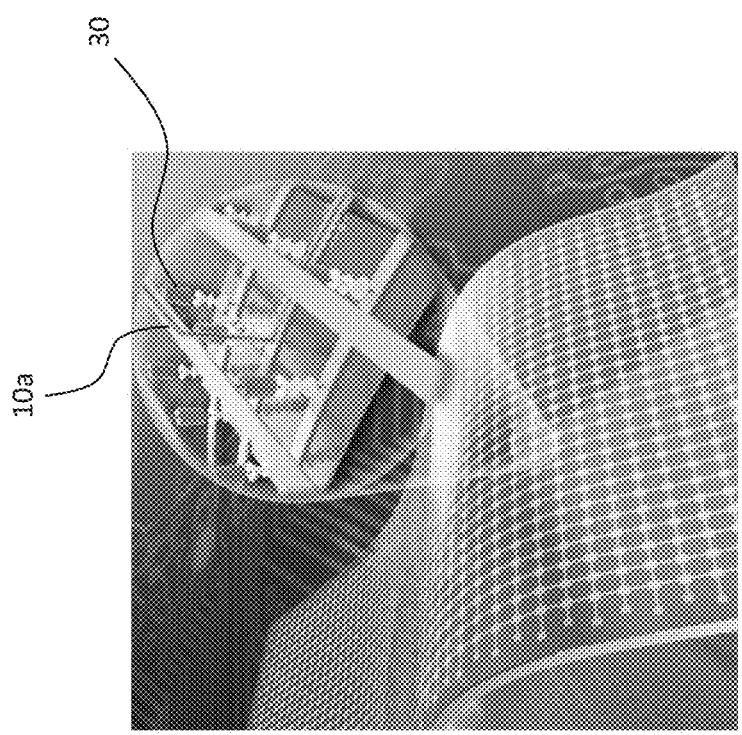
FIG. 3 depicts a fabric including a plurality of antimicrobial microcapsules distributed among electrically charged fibers of the fabric, in accordance with an embodiment of the present invention.

Referring now to FIG. 3, an embodiment of the fabric includes one or more antimicrobial microcapsules 30 that are incorporated into one or more of hemp fiber 10a, 10b, such as during primary spinning of the fibers 10a, 10b, or as a coating on the surface of the fibers 10a, 10b. Such microcapsules 30 accomplish the controlled release of antimicrobials contained therein, which is particularly useful in the cases of personal protective equipment employing the fabrics described herein. In the case of viruses, even a small electric field results from a hydrodynamically controlled rotation of the axes to align the overall electric dipoles with the applied field. This results in time-dependent electric birefringence in the virus leading to the field-induced structural changes. Such field-induced structural transitions render the virus harmless to the wearer of the fabric, derived in part from the controlled release of antimicrobials from microcapsules 30.

Experimental Results

Figure 4:
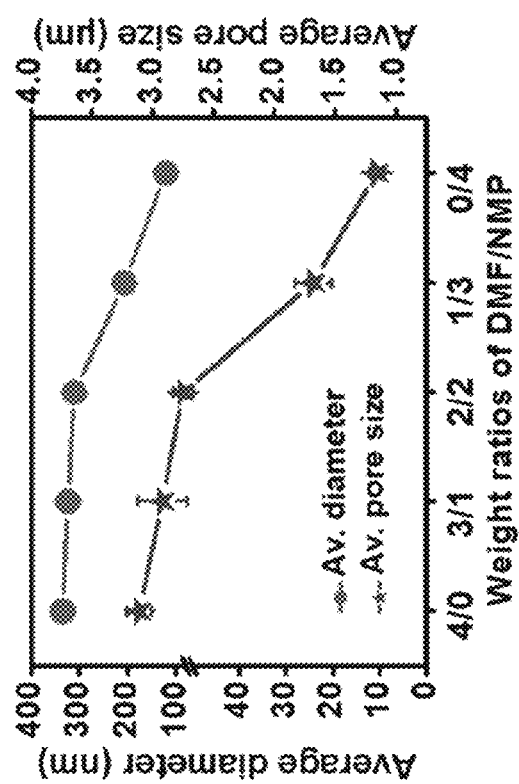
FIG. 4 is a graphical representation showing measured results of the efficacy of facemasks employing charged, coated fabrics, in accordance with an embodiment of the present invention.

As shown in FIG. 4, lab studies were performed using screen printing required for printing the circuits on the fabric to assess the electric field strength as well as the fabric's ability to denature virus simulants (exosomes and other protein nano-particles). FIG. 4 graphically depicts that minimal pressure drops were detected through the fabric, which was implemented in a facemask, showing the effectiveness of the charged fabrics described herein in the destruction of all proteinaceous nano-particles. However, it should be appreciated that the fabric can be implemented in wearable and non-wearable items other than facemasks, such as medical scrubs, carpets, table cloths, bed sheets, fitted sheets, and any other fabric commonly interacted with by humans and animals.

REFERENCES

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

[1] Nguyen, L. C. et al. (2021). Cannabidiol Inhibits SARS-CoV-2 Replication and Promotes the Host Innate Immune Response. bioRxiv: the preprint server for biology, 2021.03.10.432967.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A wearable device including an anti-pathogenic fabric woven therein, the wearable device comprising:
    a wearer-facing side opposite a surrounding environment-facing side, the wearer-facing side configured to reside adjacent to a skin surface of a wearer;
    a first fiber layer disposed proximate to the wearer-facing side, the first fiber layer including a plurality of interwoven fiber strands forming a first mesh;
    a second fiber layer disposed proximate to the surrounding environment-facing side, such that the second fiber layer is spaced apart from the first fiber layer, the second fiber layer including a plurality of interwoven fiber strands forming a second mesh;
    a photocatalytic layer coating the second fiber layer, such that the second fiber layer is disposed between the photocatalytic layer and the first fiber layer, the photocatalytic layer configured to form a first contact surface for pathogenic particles translating in a direction toward the surrounding environment-facing side of the wearable device; and
    one or more copper naphthenate particles distributed on an outward-facing surface of the photocatalytic layer, the one or more copper naphthenate particles and the photocatalytic layer configured to impart an electrical charge onto the pathogenic particles translating in the direction toward the surrounding environment-facing side of the wearable device,
    wherein the second fiber layer and the first fiber layer are configured to capture the electrically charged pathogenic particles to prevent the electrically charged pathogenic particles from traversing beyond the first fiber layer, thereby preventing interaction between the electrically charged pathogenic particles and the wearer.

2. The wearable device of claim 1, wherein each of the plurality of interwoven fiber strands of the first fiber layer are made of hemp.

3. The wearable device of claim 1, wherein each of the plurality of interwoven fiber strands of the second fiber layer are made of hemp.

4. The wearable device of claim 1, further comprising a tetrafluoroethylene layer coating the first fiber layer, such that the tetrafluoroethylene layer is disposed between the first fiber layer and the second fiber layer.

5. The wearable device of claim 1, further comprising a tetrafluoroethylene layer coating the second fiber layer, such that the tetrafluoroethylene layer is disposed between the second fiber layer and the photocatalytic layer.

6. The wearable device of claim 1, further comprising a plurality of microcapsules incorporated into at least one of the first fiber layer and the second fiber layer, each of the plurality of microcapsules including an amount of a microbial substance therein, such that the plurality of microcapsules are configured to release the amount of the microbial substance via a controlled release.

7. The wearable device of claim 1, wherein the wearable device is a face mask configured to cover a respiratory tract of the wearer, such that the face mask prevents the electrically charged pathogenic particles from reaching the respiratory tract of the wearer.

8. A method of capturing pathogenic particles via a wearable device including an anti-pathogenic fabric woven therein, the method comprising the steps of:
    interweaving a first plurality of fiber strands into a first fiber layer, the first plurality of fiber strands being made of hemp;
    interweaving a second plurality of fiber strands into a second fiber layer, the second plurality of fiber strands being made of hemp;
    coating the second fiber layer with a photocatalytic layer, such that the photocatalytic layer forms an outer contact surface;
    distributing one or more copper naphthenate particles about the photocatalytic layer, the first fiber layer, the second fiber layer, the photocatalytic layer, and the one or more copper naphthenate particles forming the wearable device configured to reside adjacent to a skin surface of a wearer;
    charging, via the one or more copper naphthenate particles and the photocatalytic layer, one or more pathogenic particles surrounding the outer contact surface; and
    capturing, via at least one of the second fiber layer and the first fiber layer, the charged one or more pathogenic particles, such that each of the charged one or more pathogenic particles are prevented from reaching the skin surface of the wearer.

9. The method of claim 8, further comprising the step of coating the first fiber layer with a tetrafluoroethylene layer, such that the tetrafluoroethylene layer is disposed between the first fiber layer and the second fiber layer.

10. The method of claim 8, further comprising the step of coating the second fiber layer with a tetrafluoroethylene layer, such that the tetrafluoroethylene layer is disposed between the second fiber layer and the photocatalytic layer.

11. The method of claim 8, further comprising the step of incorporating a plurality of microcapsules into the first fiber layer, each of the plurality of microcapsules including an amount of a microbial substance therein, such that the plurality of microcapsules are configured to release the amount of the microbial substance via a controlled release.

12. The method of claim 8, further comprising the step of incorporating a plurality of microcapsules into the second fiber layer, each of the plurality of microcapsules including an amount of a microbial substance therein, such that the plurality of microcapsules are configured to release the amount of the microbial substance via a controlled release.

13. The method of claim 8, further comprising the step of energizing the photocatalytic layer to interact with ambient air surrounding the outer contact surface, thereby forming a plurality of hydroxyl radicals on the outer contact surface.

14. The method of claim 13, wherein the step of charging one or more pathogenic particles further comprises the step of reacting the one or more pathogenic particles with the plurality of hydroxyl radicals.

15. The method of claim 8, wherein the wearable device is a face mask configured to cover a respiratory tract of the wearer, further comprising the step of preventing, via the face mask, the electrically charged pathogenic particles from reaching the respiratory tract of the wearer.

16. The method of claim 15, further comprising the step of subjecting the face mask to a cleaning agent and an amount of water, wherein the face mask is reusable after the step of subjecting the face mask to the cleaning agent and the amount of water.

17. An anti-pathogenic fabric including a plurality of interwoven fiber strands, the anti-pathogenic fabric comprising:
   a wearer-facing side opposite a surrounding environment-facing side, the wearer-facing side configured to reside adjacent to a skin surface of a wearer;
   a first fiber layer disposed proximate to the wearer-facing side, the first fiber layer including a plurality of interwoven fiber strands including an amount of hemp fiber strands interwoven with an amount of natural non-hemp fiber strands and an amount of synthetic fiber strands, forming a first mesh;
   a second fiber layer disposed proximate to the surrounding environment-facing side, such that the second fiber layer is spaced apart from the first fiber layer, the second fiber layer including a plurality of interwoven fiber strands including an amount of hemp fiber strands interwoven with an amount of natural non-hemp fiber strands and an amount of synthetic fiber strands, forming a second mesh;
   a photocatalytic layer coating the second fiber layer, such that the second fiber layer is disposed between the photocatalytic layer and the first fiber layer, the photocatalytic layer configured to form a first contact surface for pathogenic particles translating in a direction toward the surrounding environment-facing side of the wearable device; and
   one or more copper naphthenate particles distributed on an outward-facing surface of the photocatalytic layer, the one or more copper naphthenate particles and the photocatalytic layer configured to impart an electrical charge onto the pathogenic particles translating in the direction toward the surrounding environment-facing side of the wearable device,
   wherein the second mesh and the first mesh are configured to capture the electrically charged pathogenic particles to prevent the electrically charged pathogenic particles from traversing beyond the first fiber layer, thereby preventing interaction between the electrically charged pathogenic particles and the wearer.

18. The anti-pathogenic fabric of claim 17, wherein the fabric is interwoven into a face mask that is configured to cover a respiratory tract of the wearer, such that the face mask prevents the electrically charged pathogenic particles from reaching the respiratory tract of the wearer.

19. The anti-pathogenic fabric of claim 17, further comprising a first tetrafluoroethylene layer coating the first fiber layer and a second tetrafluoroethylene layer coating the second fiber layer, such that the first tetrafluoroethylene layer is disposed between the first fiber layer and the second fiber layer, and such that the second tetrafluoroethylene layer is disposed between the second fiber layer and the photocatalytic layer.

20. The anti-pathogenic fabric of claim 17, further comprising a plurality of microcapsules incorporated into at least one of the first fiber layer and the second fiber layer, each of the plurality of microcapsules including an amount of a microbial substance therein, such that the plurality of microcapsules are configured to release the amount of the microbial substance via a controlled release.

* * * * *